Nov. 20, 1956
H. P. FIEBER
2,770,981
ADJUSTABLE STEERING COLUMN
Filed Aug. 3, 1955
2 Sheets-Sheet 1
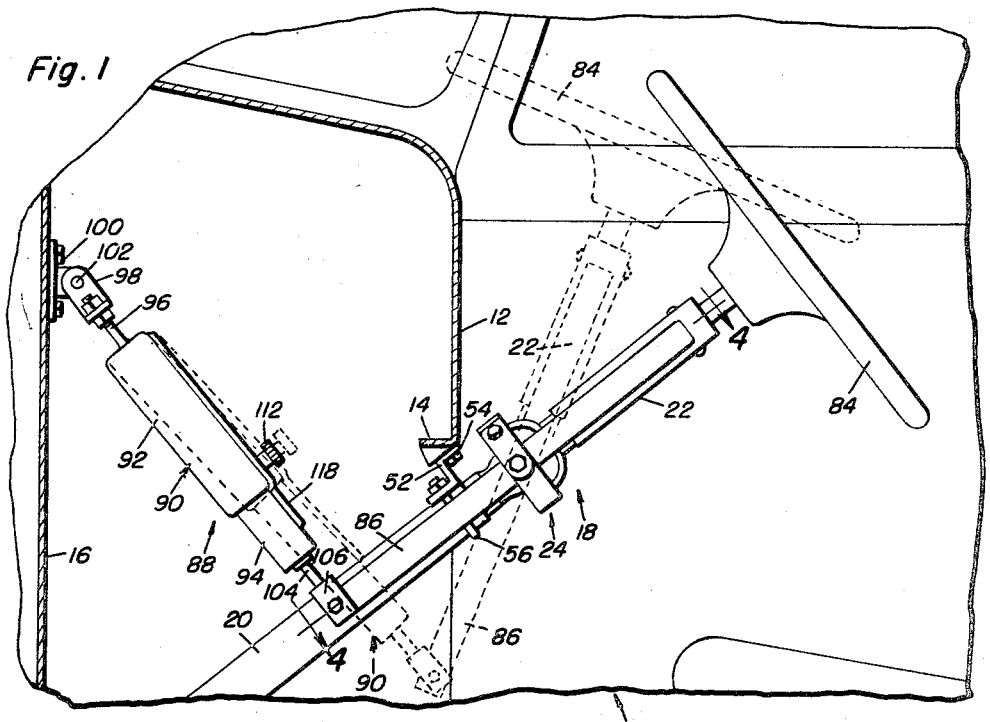
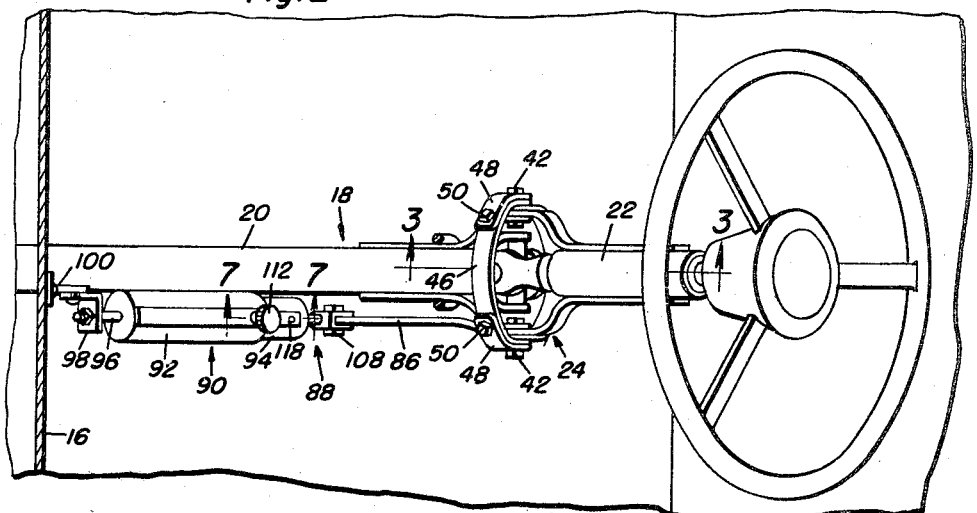
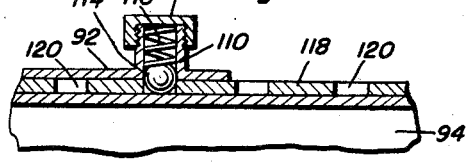
Herman P. Fieber
INVENTOR.

Nov. 20, 1956  H. P. FIEBER  2,770,981
ADJUSTABLE STEERING COLUMN
Filed Aug. 3, 1955  2 Sheets-Sheet 2
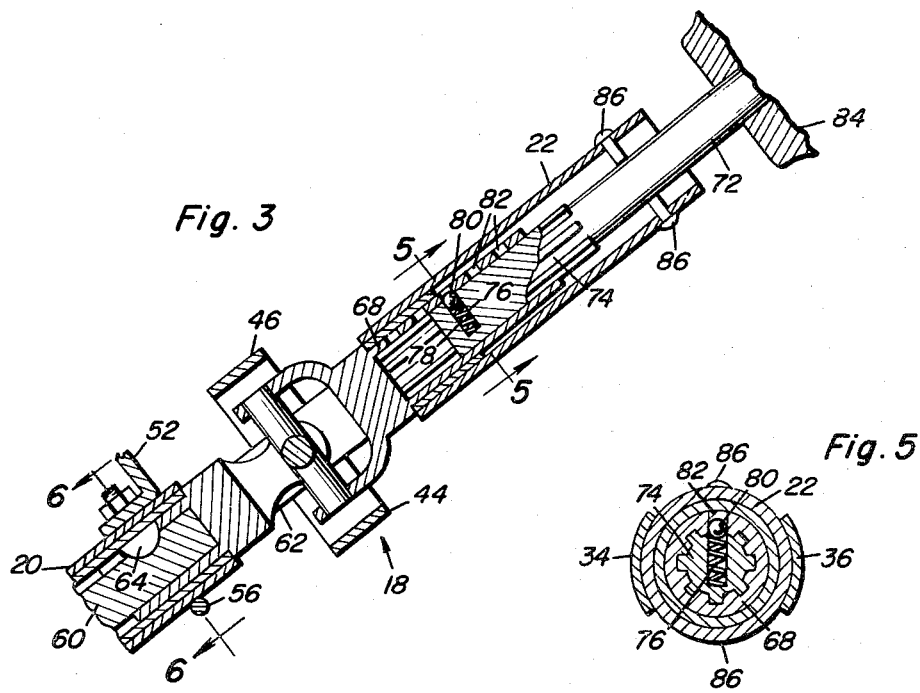
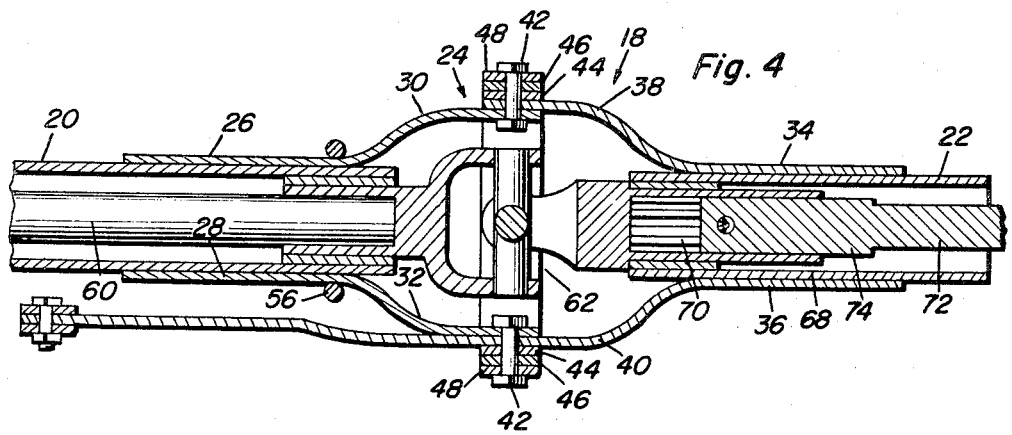
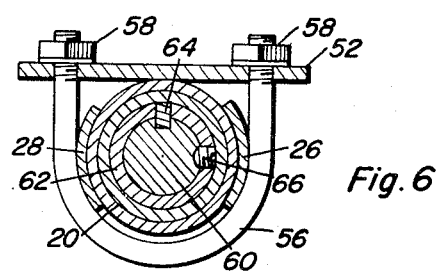
Herman P. Fieber
INVENTOR.

United States Patent Office 2,770,981
Patented Nov. 20, 1956

2,770,981

ADJUSTABLE STEERING COLUMN

Herman P. Fieber, Toledo, Oreg.

Application August 3, 1955, Serial No. 526,108

5 Claims. (Cl. 74—493)

This invention relates in general to new and useful improvements in automotive equipment, and more specifically to an improved adjustable steering column.

A primary object of this invention is to provide an improved steering column which is formed in sections and which is pivotally mounted so that both the steering wheel and the steering column may pivot to a forwardly disposed position in the event of an accident whereby impaling of the driver on the upper end of the steering column and against the steering wheel will be prevented.

Another object of this invention is to provide an improved steering column which is formed in sections and pivotally connected together, there being connected to one of the sections means for anchoring the same and there being connected to the other of the sections shock absorbing means for restraining, yet permitting movement of the section whereby the steering column may be retained in a desired position for steering the vehicle, and at the same time, the steering column will pivot in event sufficient pressure is applied thereagainst in cases such as accidents and the like.

Still another object of this invention is to provide an improved adjustable steering column which includes a lower column section anchored with respect to a vehicle and an upper column section pivotally connected to the lower column section, there being journaled in the lower column sections a lower shaft section and there being journaled in the upper column section an upper shaft section, the shaft sections being connected together by a universal joint whereby pivoting of the column in a plane longitudinal of the vehicle is permitted and at the same time, sufficient steering of the vehicle is obtainable.

A further object of this invention is to provide an improved adjustable steering column which is so constructed whereby not only may the steering column be retained in a selected angular position, but also whereby the effective length of the steering shaft may be varied so that a steering wheel may be properly positioned with respect to a driver of a vehicle for maximum control thereof.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary vertical sectional view taken through the interior of a conventional type of automobile and shows mounted therein the adjustable steering column which is the subject of this invention, the steering column being shown in an adjusted position by dotted lines;

Figure 2 is a fragmentary horizontal sectional view taken through the vehicle of Figure 1 and shows the general details of the adjustable steering column in plan;

Figure 3 is an enlarged fragmentary vertical sectional view taken substantially upon the plane indicated by the section line 3—3 of Figure 2 and shows the specific details of the connections between the various parts of the steering column which permit the adjustability thereof;

Figure 4 is an enlarged fragmentary horizontal sectional view taken substantially upon the plane indicated by the section line 4—4 of Figure 1 and shows further the details of the connections between the various components of the steering column;

Figure 5 is an enlarged transverse vertical sectional view taken substantially on the plane indicated by the section line 5—5 of Figure 3 and shows the manner in which an extension of the upper steering shaft column is adjustably connected thereto for sliding movement and at the same time is rigidly connected thereto for rotation therewith;

Figure 6 is an enlarged fragmentary vertical sectional view taken substantially upon the plane indicated by the section line 6—6 of Figure 3 and shows the manner in which the lower column section is mounted as well as the manner in which a portion of the universal fitting between the shaft sections is connected to the lower shaft section; and Figure 7 is an enlarged fragmentary vertical sectional view taken substantially upon the plane indicated by the section line 7—7 of Figure 2 and shows the specific details of the adjustable latch means of the shock absorber for retaining the steering column in a selected angular position.

Referring now to the drawings in detail, it will be seen that there is illustrated in Figures 1 and 2 a conventional type of automotive vehicle which is referred to in general by the reference numeral 10. Among other elements, the automotive vehicle 10 includes an instrument panel 12 having a lower mounting flange 14 and a fire wall 16. Mounted within the vehicle 10 is the adjustable steering column which is the subject of this invention, the adjustable steering column being referred to in general by the reference numeral 18.

The adjustable steering column 18 includes an elongated lower column section 20 whose lower end (not shown) is anchored to a steering box (not shown) of the vehicle 10. Disposed in spaced alignment with the lower column section 20 is an upper column section 22. The upper column section 22 is connected to the lower column section 20 by means of a pivotal fitting which is referred to in general by reference numeral 24, the pivotal fitting 24 permitting pivoting of the upper column section with respect to the lower column section in a vertical plane extending longitudinally of the vehicle 10.

The fitting 24 includes a pair of straps 26 and 28 which are secured to the opposite sides of the upper end of the lower column section 20. The straps 26 and 28 have diverging upper end portions 30 and 32, respectively. Secured to opposite sides of the lower end of the upper column section 22 are straps 34 and 36. The straps 34 and 36 have diverging lower portions 38 and 40, respectively. The lower portions 38 and 40 are disposed outwardly of the upper portions 30 and 32 and connected thereto by means of horizontally disposed fasteners 42 which permit pivoting between the column sections 20 and 22.

Reinforcing the connection between the straps 26, 28, 34 and 36 are ring sections 44 and 46. The ring sections 44 and 46 combine to form a ring carried by the fasteners 42. The ring section 46 is reinforced by a pair of straps 48 which are best illustrated in Figure 2, the straps 48 being connected to the ring section 46 by means of additional fasteners 50.

In order that the lower column section 20 may be supported with respect to the vehicle 10, there is secured to the mounting flange 14 a Z-shaped fitting 52 by means of a fastener 54. Carried by the Z-shaped fitting 52 is a U-bolt 56 which encircles the upper end of the lower column section 20, as is best illustrated in Figure 6. The U-bolt 56 includes adjustable nuts 58 to effect a clamping action on the upper column section 20.

Suitably journaled in the lower column section 20 is a lower steering shaft section 60. Connected to the upper end of the lower steering shaft section 60 is a universal fitting 62. The universal fitting 62 has the lower part thereof secured to the upper end of the lower shaft section 60 for rotation therewith by means of a key 64. Longitudinal movement of the universal 62 with respect to the lower shaft section 60 is prevented by means of a setscrew, which is best illustrated in Figure 6, the setscrew being referred to by the reference numeral 66.

Extending upwardly from the universal 62 is an upper shaft section 68. The upper shaft section 68 is suitably journaled in the upper column section 22 and is of a tubular configuration. The upper shaft section 68 is internally splined as at 70 and has telescoped therein an extension 72. The extension 72 has an externally splined enlarged lower portion 74 which is interlocked with the splines 70 of the upper shaft section 68. Therefore, the extension 72 may be adjusted longitudinally with respect to the upper shaft section 68 and at the same time, it is locked therewith for rotation therewith.

In order that the extension 72 may be retained in a selected extended position, there is formed in the enlarged portion 74 a bore 76 in which is seated a spring 78 and a ball detent 80. The ball detent 80 is selectively received in one of a plurality of sockets 82 formed in the upper shaft section 68. By exerting sufficient pressure on the extension 72 through the means of a steering wheel 84 connected to the upper end thereof, the extension 72 may be moved relative to the upper shaft section 68. The ball detent 80 will then seat into a selected one of the sockets 82 to retain the extension 72 in an adjusted position. Removal of the extension 72 is prevented by means of lock pins 86 carried by the upper column section 22 and engageable with the upper end of the enlarged portion 74.

From the foregoing description of the adjustable steering column, it will be readily apparent that the steering wheel 84 may be positioned as desired with respect to a driver of the vehicle 10. The steering wheel 84 may be tilted upwardly to a generally horizontal position, as is best illustrated in Figure 1, or may be tilted backwardly towards the driver. Further, it may be raised or lowered so that it will fit drivers of various heights.

In order that the steering column section 22 may be retained in a selected pivoted position, there is connected to an extension 86 of the strap 36 a shock absorber locking assembly which is referred to in general by the reference numeral 88. The shock absorber assembly 88 includes a two-piece tubular shock absorber which is referred to in general by the reference numeral 90. The two-piece shock absorber 90 includes an outer section 92 and an inner section 94. Inasmuch as the shock absorber 90 is of a conventional type, further description of the operating components thereof is believed to be unnecessary.

The outer section 92 includes a mounting rod 96 which is connected to a bracket 98. The bracket 98 is in turn pivotally connected to a bracket 100 carried by the fire wall 16 by means of a horizontal pivot pin 102.

Extending downwardly from the inner section 94 is a connecting rod 104 which terminates at its lower end in a bifurcated fitting 106. The fitting 106 is received over the lower end of the extension 86 and is connected thereto by means of a pivot 108.

As is best illustrated in Figure 7, the outer section 92 of the shock absorber 90 is provided with a tubular fitting 110 adjacent the lower end thereof. The fitting 110 opens through the outer portion 92 and has the outer end thereof closed by a cap 112. Disposed in the lower end of the fitting 110 is a ball detent 114. The ball detent 114 is urged downwardly by means of a spring 116.

Carried by the inner section 94 of the shock absorber 90 is an elongated strap 118. The strap 118 is disposed in alignment with the ball detent 114 and is provided with a plurality of sockets 120 spaced longitudinally thereof. The ball detent 114 is selectively received in one of the sockets 120 and functions as a latch to hold the sections of the shock absorber 90 in preselected positions. Thus, the ball detent 114 will serve to retain the upper column section 22 in an adjusted position, such as the dotted line position thereof in Figure 1.

In the normal use of the steering column assembly 18, the steering wheel 84 is positioned as desired and retained in place by means of a ball detent 80 and 114. Then, in the event of an accident and the driver of the vehicle 10 is thrown forward against the steering wheel 84, the extension 72 will telescope downwardly within the upper column section 22 and at the same time, the steering wheel 84 and the upper column section 22 will pivot forwardly. At this time, the shock absorber 90 comes into play and serves to absorb certain of the momentum of the driver moving forwardly as a result of the accident. Thus, the shock absorber 90 will not only serve to help retain the steering wheel 84 in a selected position, but will also take a large amount of the shock normally imparted to and sustained by the steering wheel, thereby greatly reducing the possibility of injury to the operator of the vehicle.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the appended claims.

What is claimed as new is as follows:

1. An adjustable steering column assembly comprising a lower column section, means for anchoring said lower column section, an upper column section, a pivotal fitting connecting said upper column section to said lower column section, a lower steering shaft section journaled in said lower column section, an upper shaft section journaled in said upper column section, a universal fitting connecting said upper shaft section to said lower shaft section, and means connected to said pivotal fitting to retain said upper column in a selected position, said means including a shock absorber to retard movement of said upper column section.

2. An adjustable steering column assembly comprising a lower column section, means for anchoring said lower column section, an upper column section, a pivotal fitting connecting said upper column section to said lower column section, a lower steering shaft section journaled in said lower column section, an upper shaft section journaled in said upper column section, a universal fitting connecting said upper shaft section to said lower shaft section, and means connected to said pivotal fitting to retain said upper column in a selected position, said means including an overrideable multiposition latch mechanism.

3. An adjustable steering column assembly comprising a lower column section, means for anchoring said lower column section, an upper column section, a pivotal fitting connecting said upper column section to said lower column section, a lower steering shaft section journaled in said lower column section, an upper shaft section journaled in said upper column section, a universal fitting connecting said upper shaft section to said lower shaft section, and means connected to said pivotal fitting to retain said upper column in a selected position, said means including a shock absorber to retard movement of said upper column section, and an overrideable multiposition latch mechanism.

4. An adjustable steering column assembly comprising a lower column section, means for anchoring said lower column section, an upper column section, a pivotal fitting connecting said upper column section to said lower column section, a lower steering shaft section journaled in said lower column section, an upper shaft section journaled in said upper column section, a universal fitting connecting said upper shaft section to said lower shaft section, and means connected to said pivotal fitting to retain said upper column in a selected position, said means including a shock absorber to retard movement of said upper column section, and an overrideable multiposition latch mechanism, said latch mechanism interconnecting parts of said shock absorber.

5. An adjustable steering column assembly comprising a lower column section, means for anchoring said lower column section, an upper column section, a pivotal fitting connecting said upper column section to said lower column section, a lower steering shaft section journaled in said lower column section, an upper shaft section journaled in said upper column section, a universal fitting connecting said upper shaft section to said lower shaft section, and means connecting to said pivotal fitting to retain said upper column in a selected position, said means including a shock absorber to retard movement of said upper column section, and an overrideable multiposition latch mechanism, said shock absorber being of the two-piece tubular type, said latch mechanism interconnecting parts of said shock absorber.

References Cited in the file of this patent
UNITED STATES PATENTS

| | | |
|---|---|---|
| 756,670 | Marr | Apr. 5, 1904 |
| 1,225,289 | Twombly | May 8, 1917 |
| 1,368,959 | Moller | Feb. 15, 1921 |
| 1,710,399 | Banning | Apr. 23, 1929 |